US008270314B2

(12) United States Patent
Finn et al.

(10) Patent No.: US 8,270,314 B2
(45) Date of Patent: Sep. 18, 2012

(54) SYNTHETIC FRAME LOSS RATIO

(75) Inventors: Norman William Finn, Livermore, CA (US); Lionel Florit, Greenbrae, CA (US)

(73) Assignee: Cisco Technology, Inc., San Jose, CA (US)

( * ) Notice: Subject to any disclaimer, the term of this patent is extended or adjusted under 35 U.S.C. 154(b) by 319 days.

(21) Appl. No.: 12/648,917

(22) Filed: Dec. 29, 2009

(65) Prior Publication Data

US 2011/0158112 A1 Jun. 30, 2011

(51) Int. Cl.
*H04L 12/26* (2006.01)
(52) U.S. Cl. ........................................ 370/252
(58) Field of Classification Search .......... 370/229–235, 370/236.1–236.2, 241–241.1, 252–253
See application file for complete search history.

(56) References Cited

U.S. PATENT DOCUMENTS

| | | | | |
|---|---|---|---|---|
| 7,623,449 | B2* | 11/2009 | Shabtay | 370/230 |
| 7,898,965 | B2* | 3/2011 | Mohan et al. | 370/241 |
| 7,948,909 | B2* | 5/2011 | Bugenhagen et al. | 370/252 |
| 8,045,475 | B2* | 10/2011 | Mohan | 370/241 |
| 2009/0116497 | A1 | 5/2009 | Varma et al. | |

OTHER PUBLICATIONS

ITU-T Y.1731, OAM functions and mechanisms for Ethernet based network, 80 pages, 2006.*
*Ethernet OAM Overview—Operations, Administration & Maintenance Standards*, Accedian Networks, Power Point Presentation, undated, 13 pages.
*Methods for Measuring Multipoint Services, Version 2*, Florit et al., MEF Metro Ethernet Forum, OAM PM Project, Toronto, Jul. 2008, Power Point Presentation, undated, 35 pages.

* cited by examiner

*Primary Examiner* — Frank Duong
(74) *Attorney, Agent, or Firm* — Brinks Hofer Gilson & Lione

(57) ABSTRACT

An endpoint for determining a frame loss ratio is provided. The endpoint includes a processor and a memory coupled with the processor. The memory stores instructions that are executable to generate a number of synthetic frames, and insert the number of synthetic frames into a stream of data frames, the synthetic frames being transmitted to a responder endpoint address designated in the synthetic frames. The memory may also store instructions that are executable to determine a number of lost synthetic frames; and calculate a synthetic frame loss ratio as a function of the number of lost synthetic frames and the number of synthetic frames inserted into the stream of data frames.

20 Claims, 13 Drawing Sheets

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| 1 | MEL | | | VER | | | | | OpCode (SLM) | | | | | | | | Flags () | | | | | | | | TLV Offset (40) | | | | | | | |
| 5 | Source MEP Id | | | | | | | | | | | | | | | | Responder MEP Id | | | | | | | | | | | | | | | |
| 9 | Test ID | | | | | | | | | | | | | | | | | | | | | | | | | | | | | | | |
| 13 | TxTimeStampf | | | | | | | | | | | | | | | | | | | | | | | | | | | | | | | |
| 17 | | | | | | | | | | | | | | | | | | | | | | | | | | | | | | | | |
| 21 | RxTimeStamp (Reserved for Responder Endpoint) | | | | | | | | | | | | | | | | | | | | | | | | | | | | | | | |
| 25 | | | | | | | | | | | | | | | | | | | | | | | | | | | | | | | | |
| 29 | TxTimeStamp (Reserved for Responder Endpoint) | | | | | | | | | | | | | | | | | | | | | | | | | | | | | | | |
| 33 | | | | | | | | | | | | | | | | | | | | | | | | | | | | | | | | |
| 37 | TxSeqf | | | | | | | | | | | | | | | | | | | | | | | | | | | | | | | |
| 41 | TxSeqb (Reserved for Responder Endpoint) | | | | | | | | | | | | | | | | | | | | | | | | | | | | | | | |
| | [optional TLV starts here; otherwise END TLV] | | | | | | | | | | | | | | | | | | | | | | | | | | | | | | | |
| 53 | End TLV (0) | | | | | | | | | | | | | | | | | | | | | | | | | | | | | | | |

Synthetic Loss Message 200

FIG. 2A

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| 1 | MEL | | | | Verson (0) | | | | OpCode (SLR) | | | | | | | | Flags () | | | | | | | | TLV Offset (40) | | | | | | | |
| 5 | Source MEP Id | | | | | | | | | | | | | | | | | | | | | | | Responder MEP Id | | | | | | | |
| 9 | | | | | | | | | | | | | | | | | | | | | | | | | | | | | | | | |
| 13 | Test ID | | | | | | | | | | | | | | | | | | | | | | | | | | | | | | | |
| 17 | TxTimeStampf | | | | | | | | | | | | | | | | | | | | | | | | | | | | | | | |
| 21 | | | | | | | | | | | | | | | | | | | | | | | | | | | | | | | | |
| 25 | RxTimeStamp (Reserved for Responder Endpoint) | | | | | | | | | | | | | | | | | | | | | | | | | | | | | | | |
| 29 | TxTimeStamp (Reserved for Responder Endpoint) | | | | | | | | | | | | | | | | | | | | | | | | | | | | | | | |
| 33 | TxSeqf | | | | | | | | | | | | | | | | | | | | | | | | | | | | | | | |
| 37 | TxSeqb (Reserved for Responder Endpoint) | | | | | | | | | | | | | | | | | | | | | | | | | | | | | | | |
| 41 | | | | | | | | | | | | | | | | | | | | | | | | | | | | | | | | |
| | [optional TLV starts here; otherwise END TLV] | | | | | | | | | | | | | | | | | | | | | | | | | | | | | | | |
| 53 | End TLV (0) | | | | | | | | | | | | | | | | | | | | | | | | | | | | | | | |

Synthetic Loss Reply 210

FIG. 2B

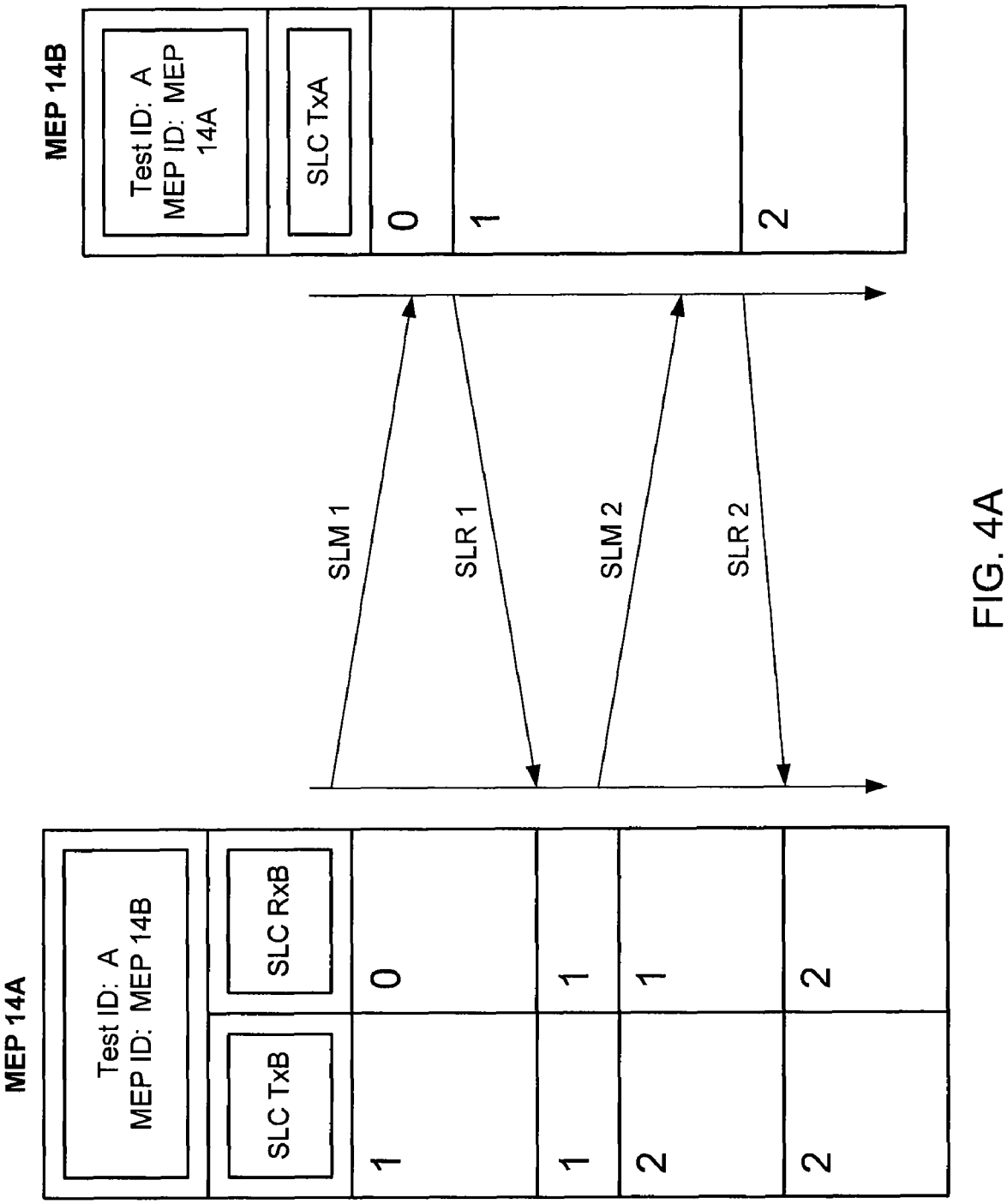

SYNTHETIC FRAME LOSS RATIO

FIELD

The present embodiments relate to data frame loss measurement.

BACKGROUND

Ethernet is a family of frame-based computer networking technologies for local area networks (LANs). Ethernet defines a number of wiring and signaling standards for the physical layer of the open systems interconnection (OSI) networking model. These wiring and signaling standards define network access at the media access control (MAC)/data link layer, and a common addressing format.

A local area network (LAN) may include Ethernet endpoints, which communicate with each other by sending and receiving other data packets. Data packets are blocks of data having one or more frames and contain user data. Each Ethernet endpoint is given a single 48-bit media access control address, which is used to specify both the destination and the source of each data packet. Data packets addressed to other Ethernet endpoints are generally not accepted by a receiving endpoint for security reasons.

Accurately determining the number of data frames lost during transmission is important for at least financial billing purposes. For example, if excessive number (e.g., above 50% or other agreed upon threshold) of data frames are lost during a number of consecutive measurement periods, then the service is declared "unavailable." A financial bill may be adjusted accordingly.

BRIEF DESCRIPTION OF THE DRAWINGS

FIG. 2A illustrates one embodiment of a synthetic loss message;

FIG. 2B illustrates one embodiment of a synthetic loss reply;

FIG. 4A illustrates one embodiment of communication between an active maintenance endpoint and a responder maintenance endpoint;

DESCRIPTION

Overview

Figure 1:
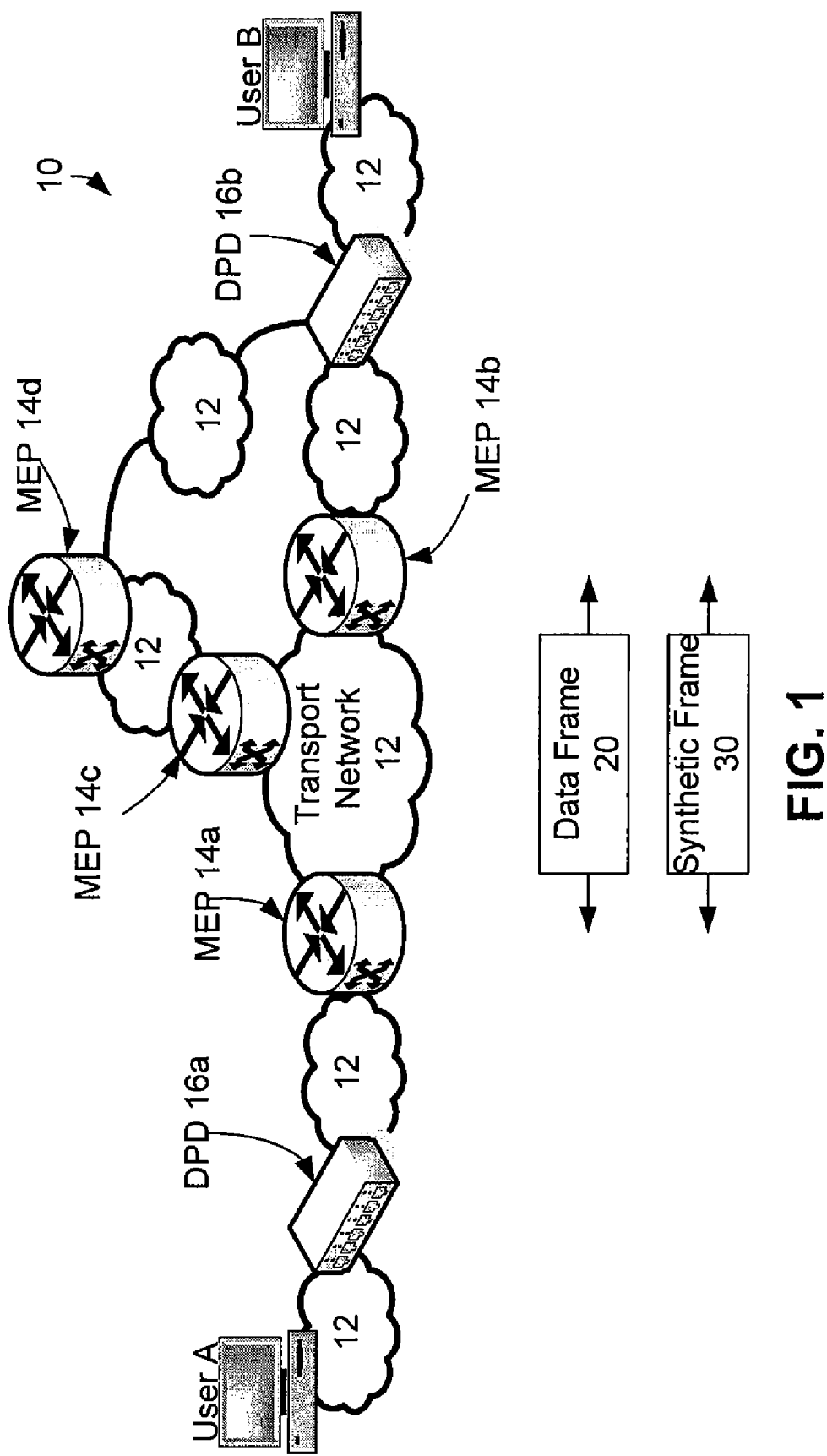
FIG. 1 illustrates one embodiment of a multipoint network having data frames and synthetic frames.

The present embodiments relate to determining a number of lost data frames, particularly in a multipoint network, using synthetic traffic. As used herein, the term "synthetic" relates to additional or extra traffic generated for measuring the number of lost data frames, i.e., synthetic traffic may be non-user traffic or an otherwise unneeded copy of other user traffic. Traffic includes messages and/or packets with a payload for a user. The number of lost frames may be measured using synthetic loss messages (SLM), synthetic loss replies (SLR), one-way synthetic loss (1SL) messages, or a combination thereof. The synthetic messages and replies may be generated by a maintenance endpoint and inserted into the flow of traffic.

A maintenance endpoint (MEP) may send one or more synthetic loss messages to an address of another maintenance endpoint, which returns a synthetic loss reply in response to each received synthetic loss message. The maintenance endpoint sending the stream of synthetic loss measurement messages may be referred to as an active maintenance endpoint (hereinafter, the "active endpoint"). The maintenance endpoint returning the synthetic loss reply may be referred to as the responder maintenance endpoint (hereinafter, the "responder endpoint").

In one embodiment, an active endpoint is operable to send synthetic frames to a responder endpoint based on the responder endpoint's address, such as the media access control (MAC) address. Accordingly, the responder endpoint counts only those frames that are supposed to be delivered to the responder endpoint (counts only the synthetic frames); not those that are flooded to extra destinations and the responder endpoint happens to receive. In response to the synthetic loss message, the responder endpoint is operable to transmit a synthetic loss reply that includes the number of synthetic frames received from the active endpoint. Accordingly, the active endpoint is operable to determine the number of synthetic frames lost as a function of the number of synthetic frame messages transmitted and the number of synthetic frame replies received. Counting synthetic messages provides a statistical measure of the proportion of data frames that are likely to have been lost. The synthetic frame loss ratio may be applied to the number of data frames transmitted between the active endpoint and responder endpoint.

In another embodiment, the active endpoint may transmit a series of one-way synthetic loss (1SL) messages. A 1SL message is a unicast or multicast message, and includes counters for the transmitting maintenance endpoint, and for each of the other maintenance endpoints for which the active maintenance endpoint is maintaining statistics. One or more active maintenance endpoints in the service listens to all of the 1SLs, and builds a matrix of counters for the participating maintenance endpoints that track the number of 1SLs sent and lost in each direction between each possible pair of participating maintenance endpoints. The 1SL message may include a counter that counts only 1SL messages, not data frames, and includes the statistics kept by the transmitter for all other maintenance endpoints being monitored, not just one other endpoint.

In one aspect, an endpoint for determining a frame loss ratio is provided. The endpoint includes a processor and a memory coupled with the processor. The memory stores instructions that are executable to generate a number of synthetic frames, and insert the number of synthetic frames into a stream of data frames, the synthetic frames being transmitted to a responder endpoint address designated in the synthetic frames. The memory may also store instructions that are executable to determine a number of lost synthetic frames; and calculate a synthetic frame loss ratio as a function of the number of lost synthetic frames and the number of synthetic frames inserted into the stream of data frames.

In a second aspect, a method for determining a frame loss ratio is provided. The method includes generating a number of synthetic frames, inserting the number of synthetic frames into a stream of data frames, and determining a number of lost synthetic frames. The method may include calculating a synthetic frame loss ratio as a function of the number of lost synthetic frames and the number of synthetic frames inserted into the stream of data frames.

In a third aspect, computer-readable storage media includes logic that is executable by a processor. When executed, the logic is operable to generate a number of synthetic frames, insert the number of synthetic frames into a stream of data frames, determine a number of lost synthetic frames using counters that may be used to determine a number of lost synthetic frames, and calculate a synthetic frame loss ratio as a function of the number of lost synthetic frames and the number of synthetic frames inserted into the stream of data frames.

In a fourth aspect, an endpoint for determining a frame loss ratio is provided. The endpoint includes a processor and a memory coupled with the processor. The memory stores instructions that are executable to determine a synthetic frame period for a measurement interval, the synthetic frame period defining a number of synthetic frames to be received during the measurement interval. The memory may also store instructions that may be executed to receive a number of synthetic frames during the measurement interval and calculate a synthetic frame loss ratio as a function of the synthetic frame period and the number of synthetic frames received during the measurement interval.

EXAMPLE EMBODIMENTS

FIG. 1 illustrates a network 10. The network 10 may include a transport network 12, one or more maintenance endpoints (MEP) 14a, 14b, 14c, and one or more demarcation point devices (DPD) 16. The transport network 12 may couple the one or more maintenance endpoints 14a, 14b, and 14c with each other and with one or more demarcation point devices 16a, 16b. For example, as shown in FIG. 1, MEP 14a is coupled with MEP 14b; MEP 14a is coupled with MEP 14c; MEP 14c is coupled with MEP 14d; MEP 14c is coupled with MEP 14b; DPD 16a is coupled with MEP 14a; and DPD 16b is coupled with MEP 14b. The term "coupled with" may include directly or indirectly connected through one or more intermediary components. Intermediary components may include hardware, software, or a combination thereof. Although shown in FIG. 1 as a point-to-multipoint network, the network 10 may also be a point-to-point network or multipoint to multi-point network.

The transport network 10 may be a communication network, such as an Ethernet network or other network or combination of networks for transporting frames. The transport network 10 may be used to transport one or more data frames 20 and/or one or more synthetic frames 30. For example, the transport network 10 may be used to transport one or more data frames 20 between User A and User B. The data frames 20 may be transmitted from demarcation point device 16a to demarcation point device 16b, for example, using the maintenance endpoints 14a, 14b, 14c, 14d. The demarcation point devices 16a, 16b may be routers, servers, or other devices that are placed on or in the boundary of a service provider network. Demarcation point device 16b may belong to the same or different service provider network than the other components of FIG. 1. In another example, the transport network 10 may be used to transport one or more data frames between the maintenance endpoints, 14a, 14b, etc.

In one illustration, communication device A may stream video-conference packets to communication device B using the network 10. The video-conference traffic may be broken into data frames 20 at demarcation device 16a and transmitted to demarcation device 16b, where the data may be reassembled and provided to communication device B. Communication device A and/or communication device B may be personal computers, servers, databases, routers, switches, endpoints, or other devices for transmitting data. Data frames 20 are used for carrying data for the user, i.e., user-related data. In order to deliver the data frames 20 to the demarcation device 16b, the data frames 20 may be transmitted from a first maintenance endpoint, such as MEP 14a, to one or more second maintenance endpoints, such as MEP 14b, MEP 14c, and/or MEP 14d. The first maintenance endpoint 14a may be referred to as an active endpoint because it is transmitting the stream of data frames 20 and the second maintenance endpoints 14b, 14c, 14d may be referred to as responder endpoints because of receiving the data frames 20.

It may be beneficial to determine the number of data frames 20 that are being lost between the active endpoint 14a and responder endpoints 14b, 14c, 14d. A financial bill may be adjusted based on the number of data frames 20 that are lost between maintenance endpoints 14a-d.

Operations, administration and maintenance (OAM) standards may be used to approximate the number of data frames lost during transmission from one endpoint to another endpoint. Depending on the type of network, the OAM standards may have limitations that cause inaccuracies when determining the number of data frames lost during transmission.

In one approach, in a point-to-point network, the Telecommunication Standardization Sector (ITU-T) recommendation Y.1731 defines two OAM packet types—loss measurement message (LMM) and loss measurement reply (LMR). The loss measurement messages and replies allow a maintenance endpoint (MEP) at one end of the network (i.e., the transmitting MEP) to query the other maintenance endpoint (i.e., the receiving MEP) to determine the data frames received by the receiving maintenance endpoint. The transmitting maintenance endpoint may send a loss measurement message each measurement period and use the reply, which includes a number of frames received, to determine how many user data frames were lost.

However, in a multipoint-to-multipoint or point-to-multipoint network, the loss measurement message (LMM) approach does not work. This is because the loss measurement message (LMM) may have a destination address unknown to the network. The loss measurement messages are flooded into the network. The receiving endpoint may receive and count frames that were not intended for the receiving endpoint. Accordingly, the receiving endpoint may count frames that are not intended for the receiving endpoint and return the number of frames received, whether intended for the receiving endpoint or not. This skews the count and determination of lost frames.

However, in one of the present embodiments, in order to determine the number of data frames 20 that are lost, the active endpoint 14a may generate and transmit synthetic frames 30 and determine a synthetic frame loss ratio for the synthetic frames 30. The synthetic frame loss ratio may be a percentage of synthetic frames that were lost during a synthetic frame loss test. However, in an alternative embodiment, the synthetic frame loss ratio may be a percentage of frames that were successfully transmitted and received, i.e., not being lost.

The synthetic frame loss ratio may be used to statistically determine the number of data packets 20 lost during transmission. For example, if the synthetic frame loss ratio between active endpoint 14a and responder endpoint 14b is 20%, the active endpoint 14a may determine that 20% of the data packets being transmitted between the active endpoint 14a and responder endpoint 14b are being lost.

The active endpoint 14a may setup the synthetic frame loss test. Setup may include defining a measurement interval and a synthetic period. The measurement interval may be a time interval over which synthetic frames will be sent back and forth between maintenance endpoints. The measurement interval may be any length of time, for example, an hour, a minute, or a second. The synthetic period may be a rate at which synthetic frames are sent. The synthetic period may be, for example, 10 times or 10 million times smaller than the measurement interval. For example, in the event that the synthetic period is 10 times smaller than the measurement interval, the active endpoint 14a may send 10 synthetic frames over the course of the measurement interval. However, in other embodiments, other periods may be used. Once defined, the active endpoint 14a may transmit the measurement interval and/or synthetic period to the responder endpoints, for example, 14b and 14c.

The active endpoint 14a may generate a synthetic frame 30. The synthetic frame 30 may be a synthetic loss message (SLM) or a one-way synthetic loss (1SL) message. As discussed in more detail below, the synthetic loss message is used to count the number of synthetic frames transmitted and received using the active endpoint 14a. The responder endpoint 14b may transmit a synthetic loss reply. The synthetic loss message and synthetic loss reply may be used to maintain two different sequence numbers (i.e., message counters). The sequence numbers may be transmitted in the synthetic traffic and incremented each time a synthetic message is transmitted and/or received. The one-way synthetic loss message is used to count the number of synthetic frames transmitted using the active endpoint 14a. The one-way synthetic loss message maintains a single sequence number.

FIG. 2A illustrates one embodiment of a synthetic loss message 200. The group level "MEL" may be the maintenance association group or maintenance entity group level, such as ITU Y.1731 sub-clause 9.1. The version "VER" may be 0x00. The operational code "OpCode" may be used to identify the type of synthetic frame, for example, synthetic loss message (SLM), synthetic loss reply (SLR), or one-way synthetic loss (1SL) message. The OpCode may also be used to distinguish between synthetic frames and other types of frames. For example, the active endpoint and responder endpoint may distinguish between user data frames and synthetic frames based on the OpCode. A user data frame may include an OpCode that indicates that user data (i.e., non-synthetic data) is included in the frame and a synthetic frame may include an OpCode that indicates that synthetic data is included in the frame. The operational code OpCode in FIG. 2A indicates that the type is a synthetic loss message (SLM). The synthetic loss message may include one or more flags "Flags". The synthetic loss message may include a test identification "Test ID." The test identification Test ID may be a 2, 4 or other byte value containing a number set by the active endpoint used to start a new test or run multiple tests simultaneously. In other words, the Test ID may be used to distinguish between different tests that are being run simultaneously. The transmission time stamp TxTimeStampf may be an 8-octet or other field that contains the timestamp of synthetic loss message transmission. In one embodiment, the format of TxTimeStampf may be the same or similar to the TimeRepresentation format in IEEE 1588-2002. The transmission sequence number TxSeqf may be a 4-octet or other value containing a sequence number incremented for successive SLM PDUs. The source identification "Source MEP ID" may be a 13-bit integer or other value identifying the transmitting maintenance endpoint. Any bits that are not used may be set to zero. The synthetic loss message 200 may also include an optional type-length-value "optional TLV". If present, a Data TLV or Test TLV may be inserted into the optional TLV. The synthetic loss message 200 may include a final TLV "End TLV." The End TLV may be an all-zero octet value, which indicates the end of the synthetic loss message.

The type-length-value fields may be used to encode optional information. The type and length fields may be fixed in size (typically 1-4 bytes), and the value field is of variable size. The type field may be a numeric code that indicates the type of the message or data being transmitted in the optional TLV field. The length field may indicate the size of the value field (typically in bytes). The value field may be a variable sized set of bytes which contains data for this part of the message. Some of the advantages of using a TLV representation may be that TLV sequences are easily searched using generalized parsing functions. New message elements which are received at an older node can be safely skipped, and the rest of the message can be parsed. TLV fields may be used in a binary format which makes parsing faster and the data smaller.

The active endpoint 14a may transmit a synthetic loss message to one or more responder endpoints according to the synthetic period. For example, in the event that the measurement interval is 1 second and the synthetic period ten (10), then the active endpoint may transmit ten (10) synthetic loss messages to the responder endpoint within a 1 second time interval. In the event that the synthetic loss message was transmitted to responder endpoint 14b, the active endpoint may increment the sequence number TxSeqf for each synthetic loss message transmitted to the responder endpoint 14b. For example, the sequence number TxSeqf may be "1" for the first message and "2" for the second message. Other indicators, numbers, letters, or representations may be used for the sequence number.

The responder endpoint 14b may receive the synthetic loss message and respond to the active endpoint 14a with a synthetic loss reply, for example, each time a synthetic loss message is received. In the event that the responder endpoint 14b receives ten (10) synthetic loss messages, then ten (10) synthetic loss replies will be sent back to the active endpoint 14a.

FIG. 2B illustrates one embodiment of a synthetic loss reply 210. The synthetic loss reply may be an updated synthetic loss message. For example, the operational code "OpCode" may be updated to indicate that the frame is a synthetic loss reply (SLR). The synthetic loss reply 210 may include a responder identification "Responder MEP ID,"

which identifies the responder endpoint, for example, using the MAC address. The responder endpoint may time stamp the reception of a synthetic loss message and the transmission of a synthetic loss reply. The reception time stamp "RxTimeStamp" may indicate the time that the synthetic loss message was received and the transmission time stamp "TxTimeStamp" may indicate the time that the synthetic loss reply was transmitted back to the active maintenance endpoint. The synthetic loss reply may also include a responder transmission sequence number "TxSeqb," which indicates the number of synthetic loss replies that were sent from the responder endpoint to the active maintenance endpoint.

The responder endpoint may increment the sequence number TxSeqb for each synthetic loss reply that is transmitted to the active maintenance endpoint. For example, the sequence number TxSeqb may be "1" for the first reply and "2" for the second reply. Other indicators, numbers, letters, or representations may be used for the sequence number.

In order to track the number of synthetic loss messages and replies that are transmitted and/or received, the active endpoint and responder endpoints may include one or more synthetic loss counters SLC. The synthetic loss counters SLC may be endpoint counters, for example, located in the active endpoints and responder endpoints. The synthetic loss counters are used to track the number of synthetic messages and replies transmitted and received; not user data frames.

The active maintenance endpoint may maintain at least two different counters per destination address for a particular test. For example, as shown in FIG. 3A, active maintenance endpoint 14a may maintain a first synthetic loss counter (SLC), such as SLC TxB, SLC TxC, and SLC TxD, for counting the number of transmitted synthetic messages transmitted to endpoints B, C and D. Active maintenance endpoint 14a may also maintain a second synthetic loss counter (SLC), such as SLC RxB, SLC RxC, and SLC RxD, for counting the number of synthetic loss replies, which were received at the active maintenance endpoint, MEP 14a. By way of example, SLC TxB is used to track (i.e., determine, calculate, count) the number of synthetic messages transmitted from MEP 14a to MEP 14b and SLC RxB is used to track the number of synthetic messages transmitted from MEP 14b to MEP 14a. Likewise, active maintenance endpoint 14a may maintain at least two different counters per MAC destination address for Test B.

Figure 3B:
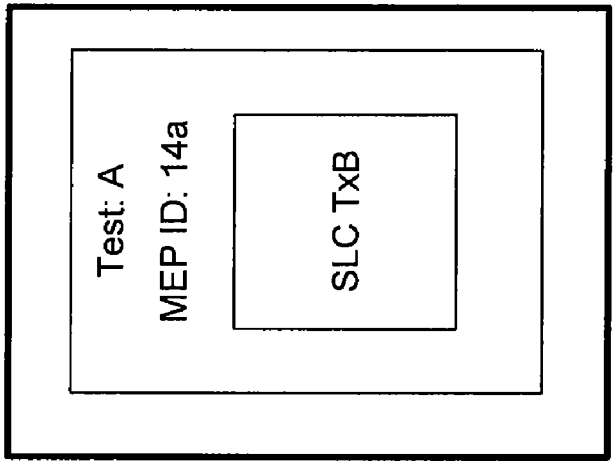
FIG. 3B illustrates one embodiment of a responder maintenance endpoint.
Figure 3A:
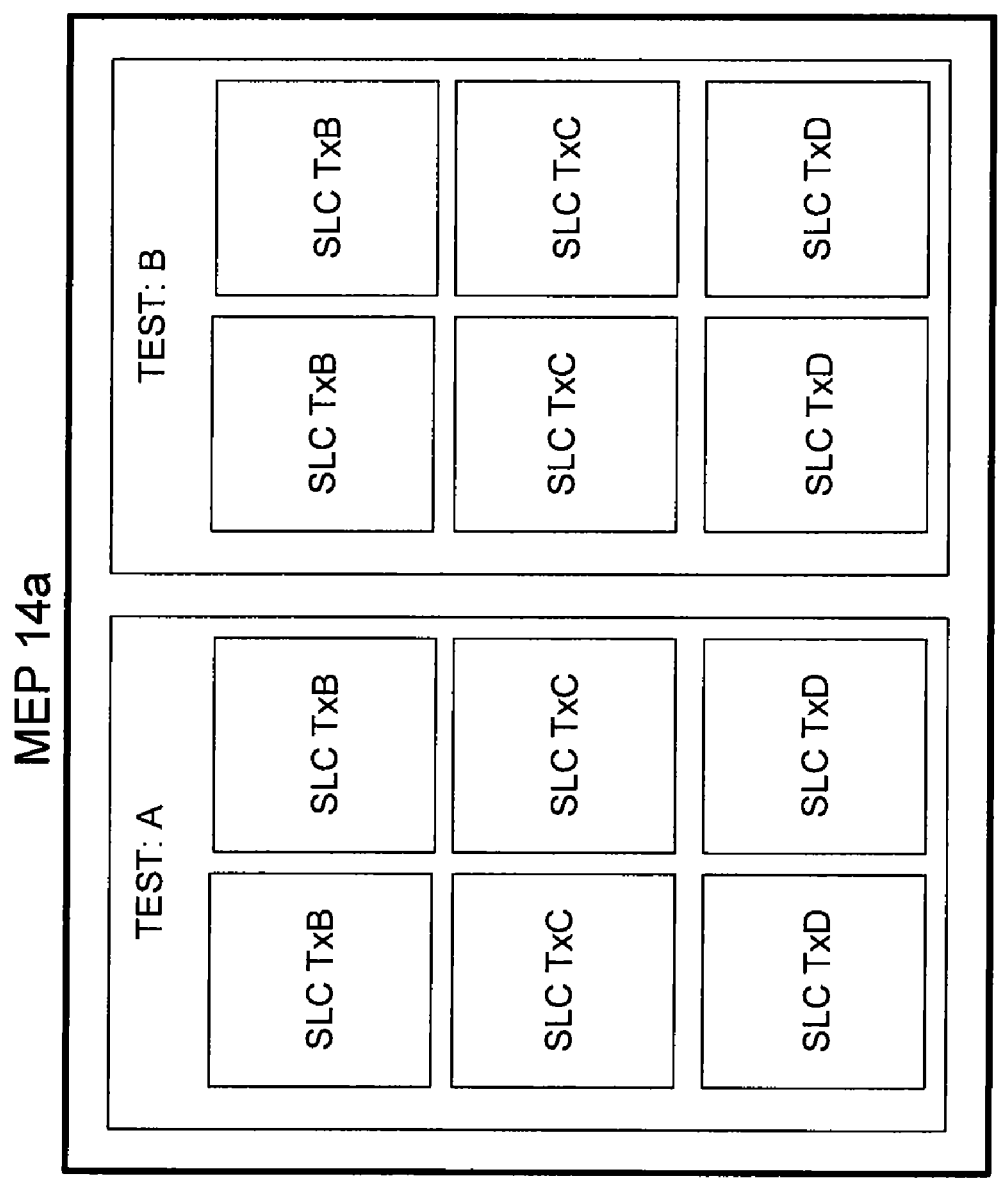
FIG. 3A illustrates one embodiment of an active maintenance endpoint.

FIG. 3B illustrates one embodiment of the responder maintenance endpoint. The responder maintenance endpoints, MEP 14b, MEP 14c, MEP 14d, MEP 14g, and MEP 14h, may maintain one running counter per source (i.e., active) maintenance endpoint per test. Responder maintenance endpoint, MEP 14b, may include counter SLC TxA, which tracks the number of synthetic loss reply messages transmitted from responder endpoint 14b to active endpoint 14a. Responder endpoint 14b may include other counters for other active maintenance endpoints and/or other tests.

The synthetic loss counters may be used to track the number of messages transmitted and received, for example, by the active maintenance endpoint and/or responder maintenance endpoint. The synthetic loss counters may be used in combination with the sequence numbers that are tracked in the synthetic loss messages and replies.

FIGS. 4A-4E illustrate the back-and-forth synthetic messaging between an active endpoint and a responder endpoint using the synthetic loss message (SLM) and synthetic loss reply (SLR). As discussed below, the active endpoint may perform the back and forth synthetic messaging with a plurality of responder endpoints, for example, simultaneously.

FIG. 4A illustrates one embodiment of synthetic messaging between an active endpoint 14a and a responder endpoint 14b using the synthetic loss message (SLM) and synthetic loss reply (SLR). Active endpoint 14a may transmit a synthetic loss message SLM 1 to the responder endpoint 14b. Upon transmitting the synthetic loss message SLM 1, active endpoint 14a may increment the synthetic loss counter SLC TxB to "1." Upon receiving the synthetic loss message SLM 1 and transmitting a synthetic loss reply SLR 1, the responder endpoint 14b may increment SLC TxA to "1." The synthetic loss reply SLR 1 may include the increment number as the sequence number TxSeqb. Upon receiving the synthetic loss reply, the active endpoint 14a may increment the number in the SLC RxB counter to "1." This process may be repeated, for example, using SLM 2 and SLR 2, throughout the measurement interval. The synthetic loss messages, for example, SLM 1 and SLM 2, may be transmitted according to the synthetic period. In other words, zero, one, or a plurality of synthetic loss messages and replies may be transmitted during the measurement interval.

Figure 4B:
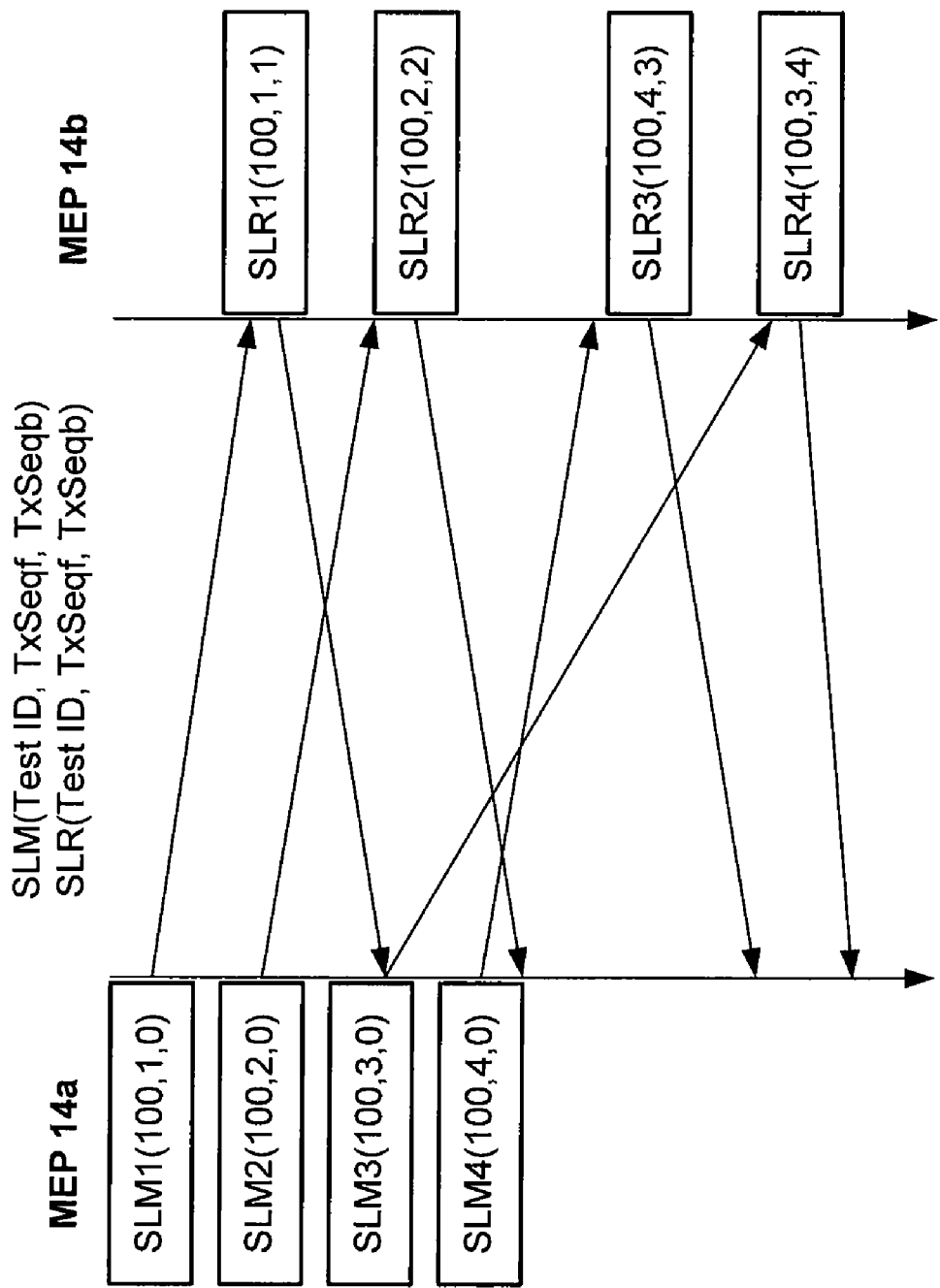
FIG. 4B illustrates another embodiment of communication between an active maintenance endpoint and a responder maintenance endpoint.

FIG. 4B illustrates another embodiment of synthetic messaging between an active endpoint 14a and a responder endpoint 14b using the synthetic loss message (SLM) and synthetic loss reply (SLR). In FIG. 4B, the synthetic loss messages are received out of order by the responder endpoint 14b. FIG. 4B illustrates the sequence numbers inside the synthetic loss messages (SLM) and synthetic loss replies (SLR). For simplicity, only the sequence numbers in the synthetic loss message and synthetic loss replies are shown. However, similar to FIG. 4A, in addition to the sequence numbers in the SLM and SLR, the active endpoint 14a and responder endpoint 14b may include one or more synthetic loss counters. As shown in FIG. 4B, the first number in the SLM or SLR is the Test ID, the second number is the active transmission sequence number "TxSeqf," and the third number is the responder transmission sequence number "TxSeqb." The synthetic messaging illustrates how these numbers are incremented. Responder endpoint 14b may receive synthetic loss message SLM4 prior to receiving synthetic loss message SLM3. This may be referred to as receiving synthetic loss messages out of order. However, once receiving synthetic loss message SLM4, the responder endpoint 14b may increment the responder transmission sequence number "TxSeqb," for example, to "3," and send back the synthetic loss reply. Once synthetic loss message SLM3 is received, the responder endpoint 14b may increment the responder transmission sequence number "TxSeqb," for example, to "3," and send back the synthetic loss reply.

Figure 4C:
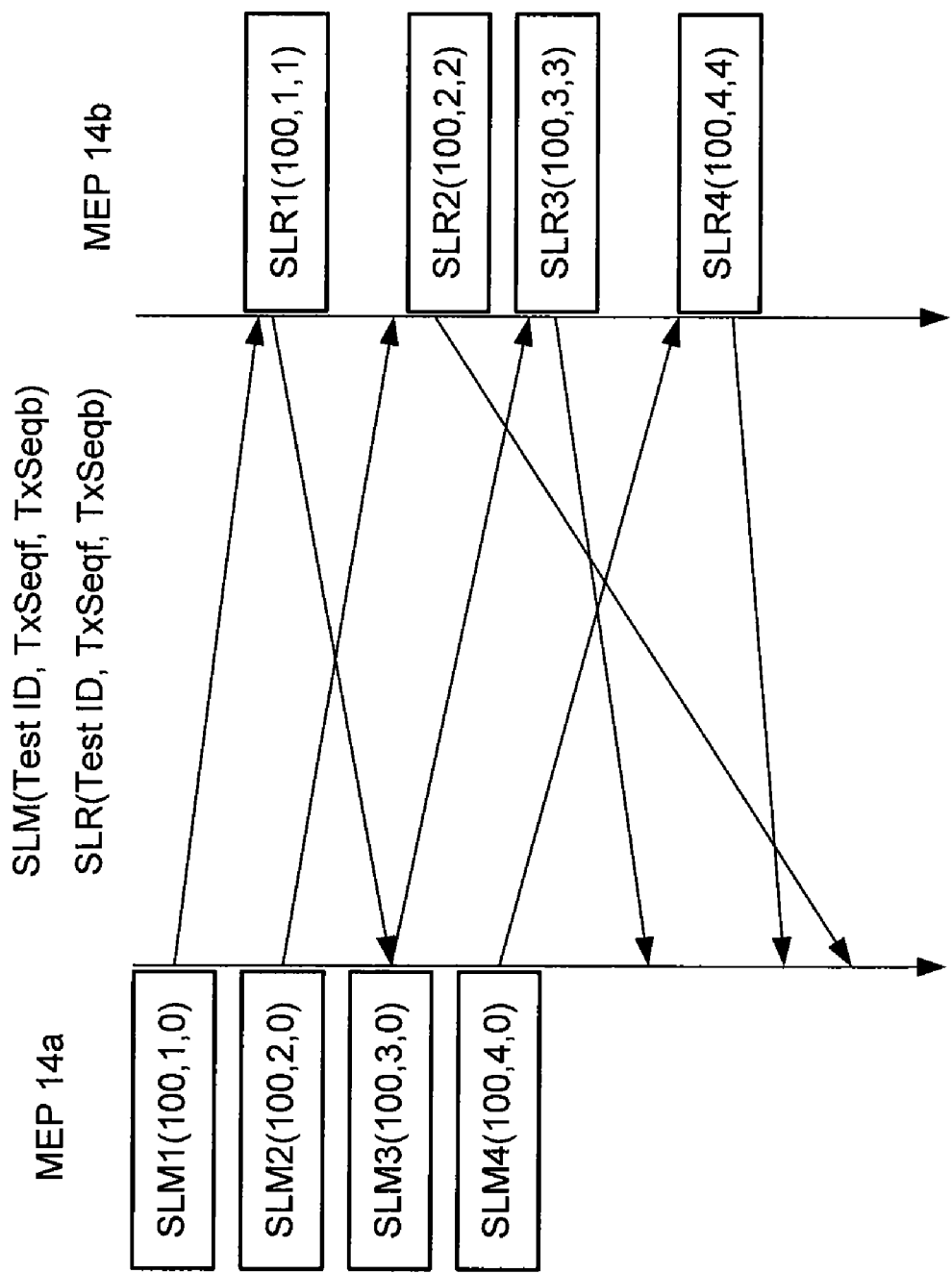
FIG. 4C illustrates yet another embodiment of communication between an active maintenance endpoint and a responder maintenance endpoint.

FIG. 4C illustrates another embodiment of synthetic messaging between an active endpoint 14a and a responder endpoint 14b using the synthetic loss message (SLM) and synthetic loss reply (SLR). In FIG. 4C, the active endpoint 14a received the synthetic loss replies out of order. The sequence numbers, for example, the active transmission sequence number and the responder transmission sequence number, may be used to detect that the out of order event and report accurate results. For example, as shown in FIG. 4C, the active endpoint 14a may receive synthetic loss reply SLR3 prior to receiving synthetic loss reply SLR2 and may receive synthetic loss reply SLR4 prior to receiving synthetic loss reply SLR2. However, because the responder endpoint increments the responder transmission sequence number "TxSeqb" each time that a synthetic loss reply is transmitted, the active endpoint 14a may determine the number of synthetic loss replies that were transmitted. For example, upon receiving synthetic loss reply SLR4, the active endpoint 14a may determine that four (4) different synthetic loss replies were transmitted by the responder endpoint 14b, even without having received synthetic loss reply SLR2.

Figure 4D:
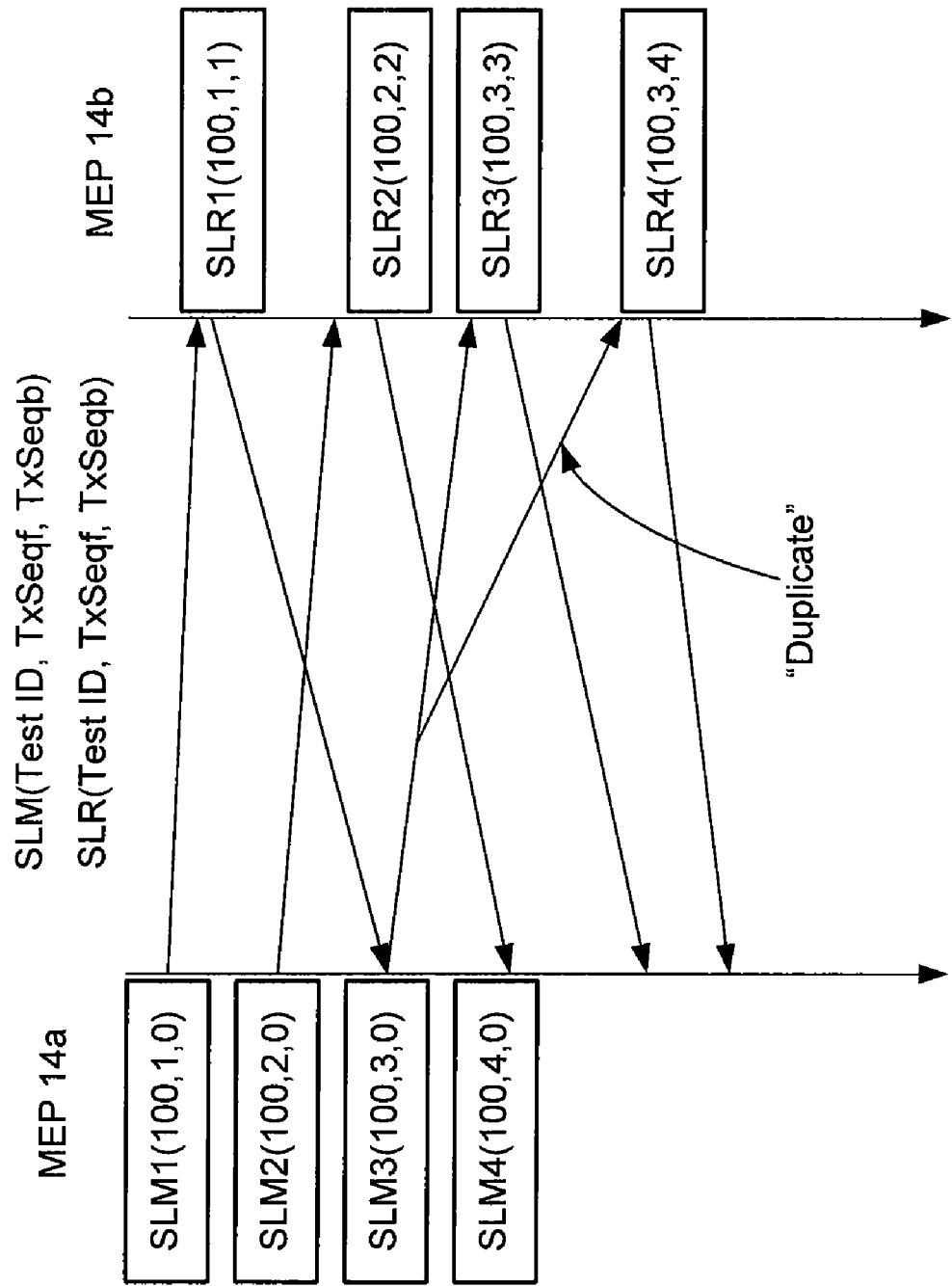
FIG. 4D illustrates yet another embodiment of communication between an active maintenance endpoint and a responder maintenance endpoint.

FIG. 4D illustrates another embodiment of synthetic messaging between an active endpoint 14a and a responder endpoint 14b using the synthetic loss message (SLM) and synthetic loss reply (SLR). In FIG. 4D, the responder endpoint 14b receives duplicate synthetic loss messages. The sequence numbers may be used to detect that the out of order event and report accurate results. As shown in FIG. 4D, the active endpoint 14a may generate a duplicate of synthetic loss message SLR3. Accordingly, the responder endpoint 14b may receive a duplicate of synthetic loss message SLR3. However, because the active endpoint 14a is configured to transmit only a certain number of synthetic loss messages during a transmission interval, the active endpoint 14a may not send synthetic loss message SLM4. Accordingly, the responder endpoint 14b will receive four (4) synthetic loss messages from the active endpoint 14a.

Figure 4E:
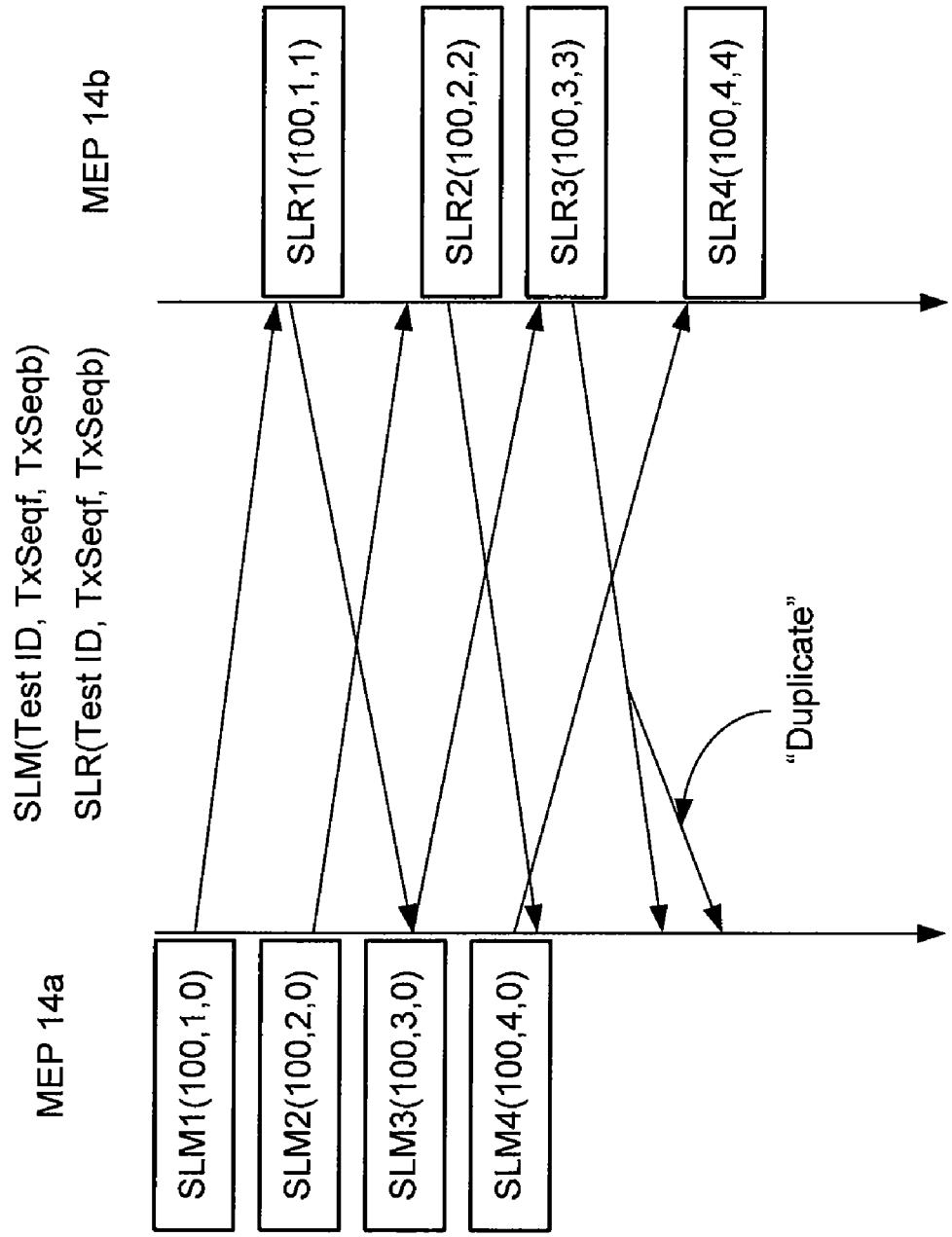
FIG. 4E illustrates yet another embodiment of communication between an active maintenance endpoint and a responder maintenance endpoint.

FIG. 4E illustrates the situation where SLRs are duplicated. In FIG. 4E, the active endpoint 14a receives duplicate synthetic loss messages. The sequence numbers may be used to detect that the out of order event and report accurate results. As shown in FIG. 4E, the responder endpoint 14b may generate a duplicate of synthetic loss message SLR3. Accordingly, the active endpoint 14a may receive a duplicate of synthetic loss message SLR3. However, because the active endpoint 14a is configured to transmit only a certain number of synthetic loss messages during a transmission interval, the responder endpoint 14b may not send synthetic loss message SLM4. Accordingly, the active endpoint 14a will only receive four (4) synthetic loss replies from the responder endpoint 14b.

The synthetic messaging may be used to track (i.e., determine, calculate, or otherwise identify) the total number of synthetic loss messages transmitted (e.g., by the active maintenance endpoint) and received (e.g., by the responder maintenance endpoint). More specifically, the active maintenance endpoint may track the total number of synthetic loss messages sent to the responder maintenance endpoint using the active sequence number TxSFf and the total number of synthetic loss replies received using the sequence number RxRFf. Additionally, the responder maintenance endpoint may return the total number of synthetic loss replies sent to the active maintenance endpoint using sequence number TxRFb.

The total number of synthetic loss messages and replies may include the number of synthetic loss messages and replies sent and received before and during the measurement interval. In order to determine the number of synthetic loss message transmitted in the measurement interval, the active maintenance endpoint may retrieve the saved totals, for example, the saved active transmission sequence number "TxSeqf_svd," the saved responder transmission sequence number "TxSeqb_svd," and the saved active received sequence number "RxSeqf," from prior to the measurement interval. The saved active transmission sequence number "TxSeqf_svd" indicates the number of synthetic loss messages transmitted to responder endpoint 14b prior to the particular test, i.e., prior to the measurement interval of the current test. The saved responder transmission sequence number "TxSeqb_svd" indicates the number of synthetic loss replies transmitted to active endpoint 14a from the responder endpoint 14a prior to the particular test. The saved active received sequence number "RxSLCb" indicates the number of synthetic loss replies received from the responder endpoint 14b prior to the particular test. For example, as shown in Equations 1-3 the number of synthetic loss messages and synthetic loss replies, for the given measurement interval, may be calculated as follows:

Number of SLMs sent by the active endpoint in the measurement interval=$TxSeqf - TxSeqf\_svd$     Equation 1

Number of SLMs received by the responder endpoint in the measurement interval=$TxSeqb - TxSeq\_svd$     Equation 2

Number of SLRs received by the active endpoint in the measurement interval=$RxSLCb - RxSLCb\_svd$     Equation 3

The number of synthetic loss messages sent by the active endpoint 14a in the measurement interval, the number of synthetic loss messages received by the responder endpoint 14b in the measurement interval, and the number of synthetic loss replies received by the active endpoint 14a in the measurement interval may be used to calculate the number of lost synthetic loss messages in the measurement interval and the number of lost synthetic loss replies in the measurement interval, for example, using Equations 4-5.

Number of lost synthetic loss messages in the measurement interval=$(TxSeqf - TxSeqf\_svd) - (TxSeqb - TxSeqb\_svd)$     Equation 4

Number of lost synthetic loss replies in the measurement interval=$(TxSeqb - TxSeqb\_svd) - (RxSLCb - RxSLCb\_svd)$     Equation 5

The number of lost synthetic loss messages in the measurement interval and the number of lost synthetic loss replies in the measurement interval may be used to determine the synthetic frame loss ratio. For example, the synthetic frame loss ratio may be determined based on the number of synthetic loss messages sent by the active endpoint 14a in the measurement interval and the number of lost synthetic loss messages in the measurement interval, for example, as shown in Equation 6.

Synthetic frame loss ratio=(the number of lost synthetic loss messages in the measurement interval)/(the number of synthetic loss messages sent by the active endpoint in the measurement interval)     Equation 6

In one illustration, the active measurement endpoint transmits (ten) 10 frames in a measurement interval and two (2) frames are lost in the measurement interval. The synthetic frame loss ratio is then equal to 20% (i.e., (2/10)*100)). Since the data frames 20 and synthetic frames 30 are transmitted across the same network 10, the synthetic frame loss ratio may be used as the data frame loss ratio. Accordingly, in this illustration, the data frame loss ratio may be 20%. Other calculations using the same data or different data may be used. For example, only the counts for transmission from and replies received back at the active endpoint are used.

The number of synthetic messages transmitted and/or received, which are counted by the counters, may be counted before, after, or during any time period. For example, multiple time periods may be defined and the endpoints may use calculations at any of these time periods to ensure accuracy.

In order to determine the total synthetic frame loss ratio, one or more active endpoints may be polled. Polling may include scattered polling, rooted polling, or one-stop polling. Scattered polling includes polling every endpoint, including active and/or responder endpoints, to get information about relationships among the polled endpoints. Rooted polling includes polling one active endpoint to get information relating that endpoint to each of the other endpoints. One-stop polling includes polling one active endpoint to get information about every one of the $n*(n-1)/2$ relationships among the endpoint.

Figure 5:
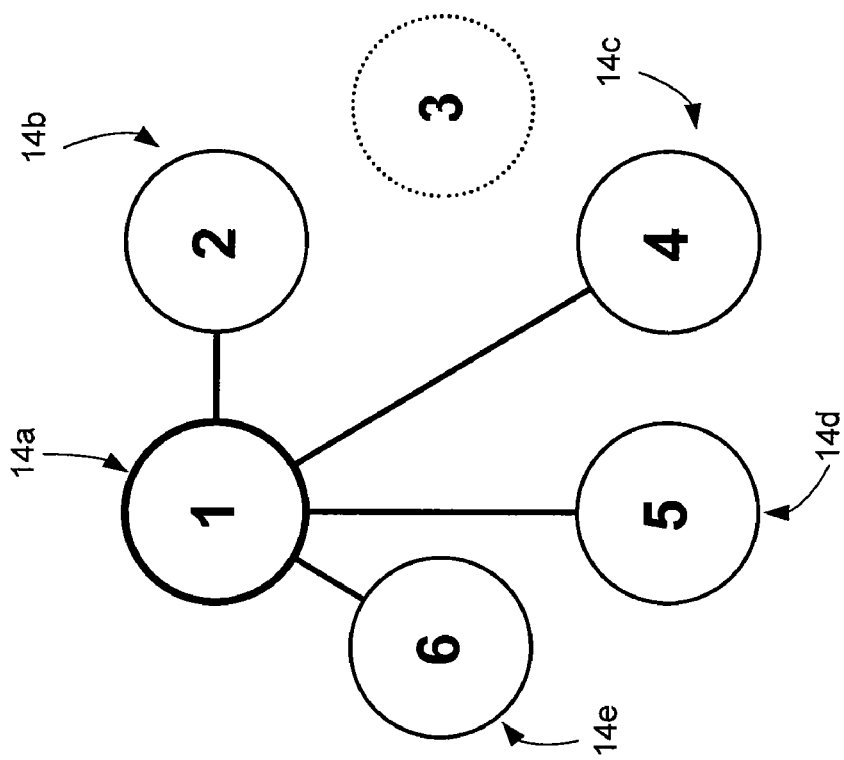
FIG. 5 illustrates one embodiment of a point-to-multipoint network having an active endpoint and a plurality of responder endpoints.

The same time interval may be used by the active endpoint for a synthetic frame loss ratio between the active maintenance endpoint and a plurality of responder maintenance endpoints. For example, as shown in FIG. 5, the active endpoint 14a may determine a synthetic frame loss ratio between 14a and 14b, 14a and 14c, 14a and 14d, and 14a and 14e. Since the active endpoint 14a includes a pair of counters for each responder endpoint 14b, 14c, 14d, and 14e, the active endpoint 14a may perform the back-and-forth synthetic messaging with each of the responder endpoints during the same measurement interval.

Figure 6:
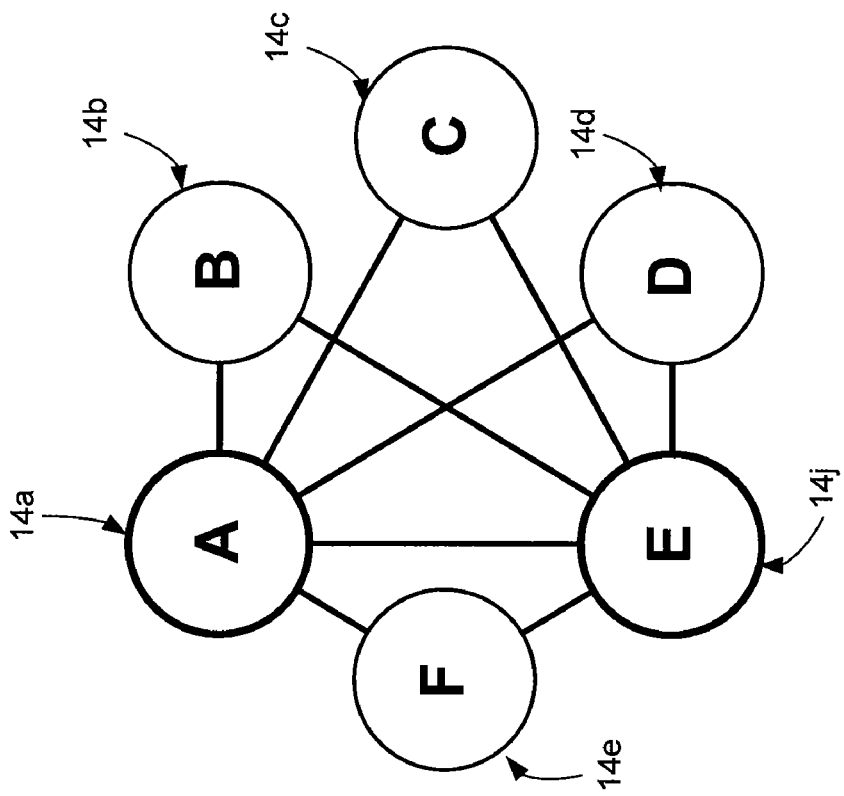
FIG. 6 illustrates one embodiment of a point-to-multipoint network having a plurality of active endpoints and a plurality of responder endpoints.

Multiple active endpoints may be performing tests during the same or overlapping measurement intervals. For example, as shown in FIG. 6, active maintenance endpoint 14a may be performing a synthetic frame loss test at the same time as active maintenance endpoint 14j.

In one embodiment, a management system may poll one or more maintenance endpoints to acquire data about the synthetic frame loss ratio. In a multipoint-to-multipoint network, point-to-point measurements must be combined into a single picture. If measurements can be made from a single "active" endpoint, then only active endpoints need to be polled by the management system, but only connectivity to and from that endpoint is measured. If a more complete picture of the losses is required, multiple active endpoints are used. In a more complete case, each endpoint has statistics on only one direction, to or from that endpoint to the other endpoints. In that case, every involved endpoint is polled by the management system. If multiple endpoints are polled, then measurements with different starting time points for the measurement periods and measurement intervals are integrated.

In one embodiment, the management system may analyze the synthetic frame loss ratio for one or more measurement intervals. For example, the synthetic frame loss ratio for a plurality of measurement intervals may be used to determine when the link between an active endpoint and responder endpoint is unavailable. In one example, the management system may determine that a link is unavailable when the synthetic frame loss ratio is above a predefined threshold for one or more measurement intervals. For example, the management system may determine that the link between active endpoint 14a and responder endpoint 14b is unavailable when the synthetic frame loss ratio is greater than 10% for three consecutive measurement intervals. Alternatively, a total number of measurement intervals above the threshold may be used.

In one embodiment, the synthetic messages may be piggybacked onto other messages. For example, synthetic loss message information may be piggybacked as a TLV on top of a delay measurement message (DMM). A delay measurement message may be used to determine the delay in the network 10. In another example, 1SL information may be piggybacked as a TLV on top of the 1DM, a connectivity check message (CCM), or test message (TST). The total number of OAM frames that must be sent is reduced. However, the complexity of the implementation is increased because two OAM jobs are being done by a single OpCode, and the synthetic period is slowed to the rate of the DMM/1DM/CCM measurement period. The synthetic messages counters may also be added to a new version of a DMM/1DM or CCM messages as defined in Y.1731 today.

Figure 7:
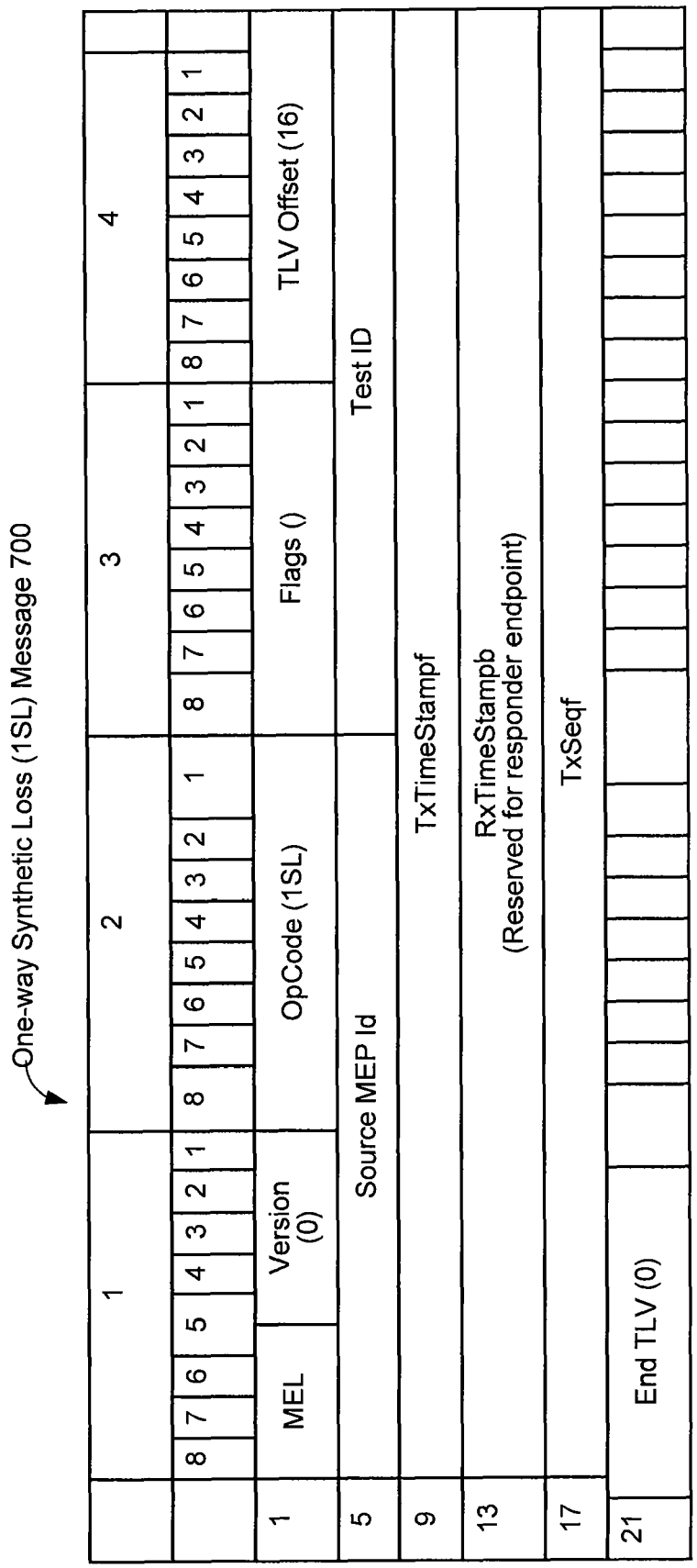
FIG. 7 illustrates one embodiment of a one-way synthetic loss message.

FIG. 7 illustrates one embodiment of a 1-way Synthetic Loss (1SL) message 700. The 1-way Synthetic Loss (1SL) message may include a DMM transmission time stamp "TxTimeStampf" and a delay measurement message (DMM) reception time stamp "RxTimeStampf," delay message response (DMR) transmission time stamp "TxTimeStampb," and a sequence number "TxSeqb." The DMM transmission time stamp TxTimeStampf may be an 8-octet or other field that contains a copy of TxTimeStampf field in received DMM. The DMM reception time stamp RxTimeStampf may be an optional 8-octet or other field that contains the timestamp of DMM reception. The format of RxTimeStampf is equal to the TimeRepresentation format in IEEE 1588-2002, but other data formats may be used. When not used, a value of all 0 is used. The DMR transmission time stamp TxTimeStampb is an optional 8-octet or other field that contains the timestamp of DMR transmission. The format of TxTimeStampb may be equal to the TimeRepresentation format in IEEE 1588-2002, but other data formats may be used. When not used, a value of all 0 is used. The sequence number TxSeqb may be a 4-octet or other value containing a running counter incremented each time an SLM received.

A series of one-way synthetic loss (1SL) messages may be transmitted by one or more maintenance endpoints in a network. A 1SL message is a multicast, and includes counters for the transmitting maintenance endpoint, and for each of the other maintenance endpoints for which the active maintenance endpoint is maintaining statistics. One or more active maintenance endpoints in the service listens to all of the 1SLs, and builds a matrix of counters for the participating maintenance endpoints that track the number of 1SLs sent and lost in each direction between each possible pair of participating maintenance endpoints. The 1SL message may include a counter that counts only 1SL messages, not data frames, and includes the statistics kept by the transmitter for all other maintenance endpoints being monitored, not just one other endpoint.

In other words, each responder maintenance endpoint sends a 1SL at a synthetic period. The active maintenance endpoint knows the synthetic period. This lets any number of monitored endpoints to transmit their statistics, so that an active endpoint can calculate, for each monitored endpoint the number of 1SLs that were sent and for each direction between each pair of monitored endpoints, the number of 1SLs that were lost.

In one alternative embodiment, a synthetic message may include an operational code that is defined as a delay measurement (DMM), delay measurement response (DMR), or one-way delay measurement (1DM). However, the version field may be incremented from "0" to "1" indicating that a synthetic message is incorporated into the delay measurement, delay measurement response, or one-way delay measurement. The synthetic loss message (SLM), synthetic loss reply (SLR), and/or one-way synthetic loss message (1SL) may be incorporated into the optional TLV field of the delay measurement, delay measurement response, or one-way delay measurement. During the transition period to using synthetic messages, the network 10 may include endpoints that are not configured for synthetic message (hereinafter, "non-synthetic endpoints"), and endpoints are configured for synthetic messaging (hereinafter, "synthetic endpoints"). Because of the way the version field "VER" is used, a frame with the existing opCodes (DMM/DMR/1DM) and a new version number (1) is seen and acted upon by the non-synthetic endpoints as previous version "0," which relates to DMM/DMR/1DM. The optional fields for SLM/SLR/1SL are ignored by the non-synthetic endpoints, but the DMM/DMR/1DM operations are performed properly. A synthetic endpoint may send out only broadcast or multicast version 1 DMMs or 1DMs. The non-synthetic endpoints handle these exactly as version 0 DMM/1DM, and reply DMM with version 0 DMR, while the synthetic endpoints do both the delay measurement and synthetic loss operations.

Figure 8:
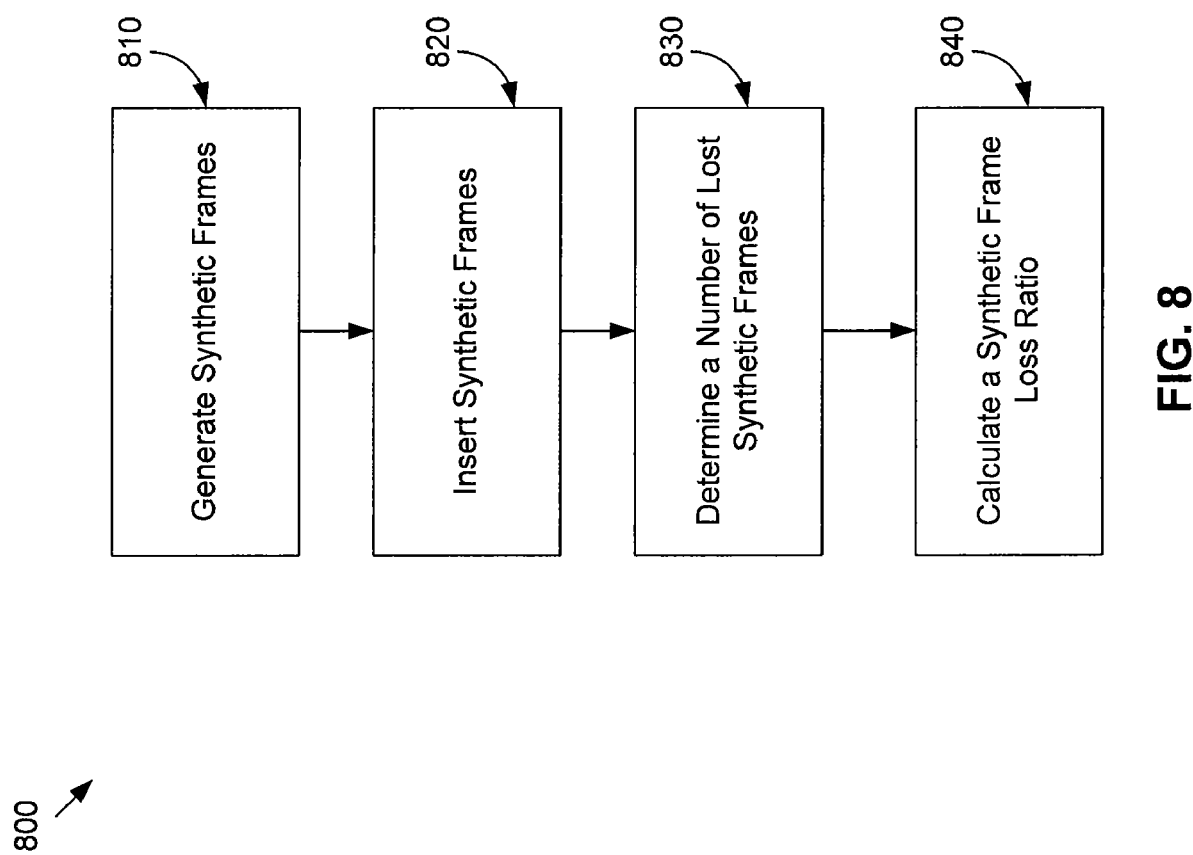
FIG. 8 illustrates one embodiment of a method for determining a synthetic loss ratio.

FIG. 8 illustrates one embodiment of a method 800 for determining a number of lost data frames. The method 800 includes generating a number of synthetic frames 810, inserting the number of synthetic frames into a stream of data frames 820, determining a number of lost synthetic frames 830; and calculating a synthetic frame loss ratio as a function of the number of lost synthetic frames and the number of synthetic frames inserted into the stream of data frames 840.

As shown in act 810, an active maintenance endpoint may generate a number of synthetic frames. The synthetic frames may be inserted into a data frame stream, as shown in act 820. Inserting the synthetic frames may include transmitting the synthetic frames to a second maintenance endpoint. The synthetic frames may be transmitted according to a synthetic frame period. The number of lost synthetic frames 830 may be determined in act 830. Determining the number of lost synthetic frames may include counting a number of synthetic frames transmitted to a first responder endpoint using a first counter and counting a number of synthetic replies received from the first responder endpoint using a second counter.

As shown in act 840, the active maintenance endpoint may calculate a synthetic frame loss ratio as a function of the number of lost synthetic frames and the number of synthetic frames inserted into the stream of data frames. The number of synthetic frames inserted into the stream of data frames may be compared to a sequence number inserted in the synthetic frame reply. A number of lost data frames may be determined using the synthetic frame loss ratio. The number of lost data frames may be output to a user, for example, using a display device, or stored in memory, and a financial bill may be adjusted based on the number of lost data frames.

Figure 9:
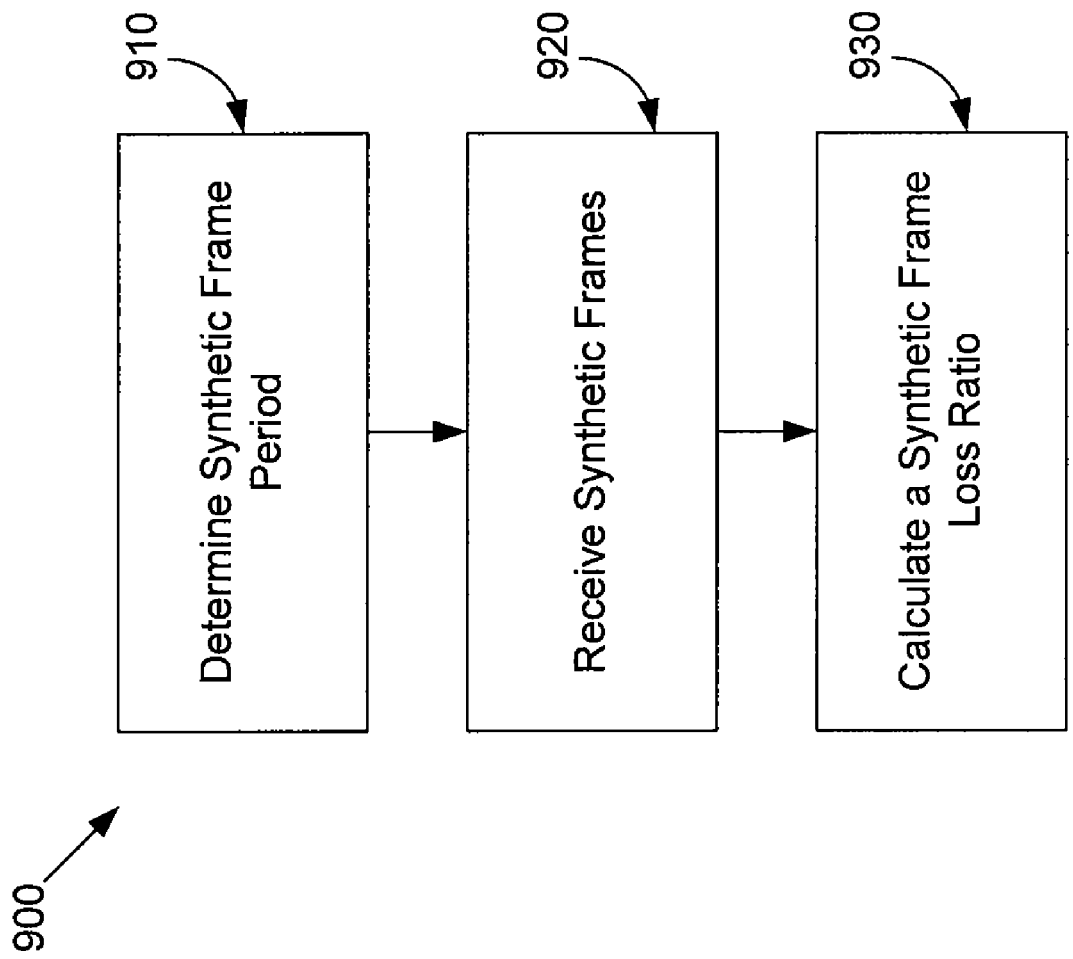
FIG. 9 illustrates another embodiment of a method for determining a synthetic loss ratio.

FIG. 9 illustrates one embodiment of a method 900 for determining a synthetic frame loss ratio. The method 900 includes determining a synthetic frame period for a measurement interval 910, receiving a number of synthetic frames during the measurement interval 920, and calculating a synthetic frame loss ratio as a function of the synthetic frame period and the number of synthetic frames received during the measurement interval 930. The synthetic frame period defines a number of synthetic frames to be received during the measurement interval. The synthetic frame may be a one-way synthetic loss message.

While the disclosure has been described above by reference to various embodiments, it should be understood that many changes and modifications can be made without departing from the scope of the invention. It is therefore intended that the foregoing detailed description be regarded as illustrative rather than limiting.

The invention claimed is:

1. An endpoint comprising:
a processor; and
a memory coupled with the processor, the memory storing instructions that are executable to:
generate a number of synthetic frames,
insert the number of synthetic frames into a stream of data frames, the synthetic frames being transmitted to a responder endpoint address designated in the synthetic frames,
determine a number of lost synthetic frames; and
calculate a synthetic frame loss ratio as a function of the number of lost synthetic frames and the number of synthetic frames inserted into the stream of data frames.

2. The endpoint of claim 1, wherein the memory stores instructions that are executable to insert the number of synthetic frames into the stream of data frames according to a synthetic frame period.

3. The endpoint of claim 1, wherein the memory stores instructions that are executable to count a number of synthetic frames transmitted to a first responder endpoint using a first counter and count a number of synthetic frames received from the first responder endpoint using a second counter.

4. The endpoint of claim 3, wherein at least one synthetic frame transmitted to the first responder endpoint is a synthetic frame message and at least one synthetic frame received from the first responder endpoint is a synthetic frame reply.

5. The endpoint of claim 1, wherein the memory stores instructions that are executable to determine the number of lost synthetic frames by comparing the number of synthetic frames inserted into the stream of data frames and a sequence number inserted in a synthetic frame reply.

6. The endpoint of claim 5, wherein the memory stores instructions that are executable to increment a first counter and a second counter, the first counter counting a number of synthetic frames transmitted to a first responder endpoint and the second counter counting a number of synthetic replies received from the first responder endpoint.

7. The endpoint of claim 1, wherein the memory stores instructions that are executable to calculate a number of lost data frames using the synthetic frame loss ratio and output the number of lost data frames.

8. The endpoint of claim 7, wherein the data frames carry user data and the synthetic frames do not carry user data.

9. A method comprising:
generating, using a processor, a number of synthetic frames,
inserting the number of synthetic frames into a stream of data frames,
determining, using the processor, a number of lost synthetic frames; and
calculating, using the processor, a synthetic frame loss ratio as a function of the number of lost synthetic frames and the number of synthetic frames inserted into the stream of data frames.

10. The method of claim 9, further comprising inserting the number of synthetic frames into the stream of data frames according to a synthetic frame period.

11. The method of claim 9, further comprising counting a number of synthetic frames transmitted to a first responder endpoint using a first counter and counting a number of synthetic frames received from the first responder endpoint using a second counter.

12. The method of claim 9, further comprising comparing the number of synthetic frames inserted into the stream of data frames to and a sequence number inserted in a synthetic frame reply.

13. The method of claim 9, further comprising calculating a number of lost data frames using the synthetic frame loss ratio.

14. The method of claim 13, further comprising outputting the number of lost data frames and adjusting a financial bill based on the number of lost data frames.

15. A endpoint for determining a frame loss ratio, the endpoint comprising:
a processor; and
a memory coupled with the processor, the memory storing instructions that are executable to:
determine a synthetic frame period for a measurement interval, the synthetic frame period defining a number of synthetic frames to be received during the measurement interval;
receive a number of synthetic frames during the measurement interval; and
calculate a synthetic frame loss ratio as a function of the synthetic frame period and the number of synthetic frames received during the measurement interval.

16. The endpoint of claim 15, wherein the instructions are executable to count a number of synthetic frames received using a first counter and count a number of synthetic frames transmitted using a second counter.

17. The endpoint of claim 15, wherein the instructions are executable to determine a number of lost synthetic frames by comparing the number of synthetic frames received and a sequence number transmitted.

18. A method comprising:
 determining, using a processor, a synthetic frame period for a measurement interval, the synthetic frame period defining a number of synthetic frames to be received during the measurement interval;
 receiving a number of synthetic frames during the measurement interval; and
 calculating, using the processor, a synthetic frame loss ratio as a function of the synthetic frame period and the number of synthetic frames received during the measurement interval.

19. The method of claim 18, further comprising counting a number of synthetic frames received using a first counter and counting a number of synthetic frames transmitted using a second counter.

20. The method of claim 18, further comprising determining a number of lost synthetic frames by comparing the number of synthetic frames received and a sequence number transmitted.

* * * * *

UNITED STATES PATENT AND TRADEMARK OFFICE
CERTIFICATE OF CORRECTION

| | | |
|---|---|---|
| PATENT NO. | : 8,270,314 B2 | Page 1 of 1 |
| APPLICATION NO. | : 12/648917 | |
| DATED | : September 18, 2012 | |
| INVENTOR(S) | : Norman W. Finn et al. | |

It is certified that error appears in the above-identified patent and that said Letters Patent is hereby corrected as shown below:

In the Claims

Column 14, Line 46, please delete "and" after --to--.

Signed and Sealed this
Eleventh Day of December, 2012

David J. Kappos
*Director of the United States Patent and Trademark Office*